US009567180B2

(12) United States Patent
Murodate (10) Patent No.: US 9,567,180 B2
(45) Date of Patent: Feb. 14, 2017

(54) SHEET CONVEYING DEVICE AND IMAGE READING APPARATUS (71) Applicant: BROTHER KOGYO KABUSHIKI KAISHA, Nagoya-shi, Aichi-ken (JP)

(72) Inventor: Yusuke Murodate, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/861,297

(22) Filed: Sep. 22, 2015

(65) Prior Publication Data

US 2016/0083214 A1 Mar. 24, 2016

(30) Foreign Application Priority Data

Sep. 22, 2014 (JP) ................. 2014-192970

(51) Int. Cl.
*B65H 1/04* (2006.01)
*B65H 31/02* (2006.01)
*H04N 1/00* (2006.01)
*B65H 31/20* (2006.01)

(52) U.S. Cl.
CPC ................ *B65H 31/02* (2013.01); *B65H 1/04* (2013.01); *B65H 31/20* (2013.01); *H04N 1/0053* (2013.01); *H04N 1/00525* (2013.01); *H04N 1/00535* (2013.01); *B65H 2402/45* (2013.01); *B65H 2405/111646* (2013.01); *B65H 2405/324* (2013.01); *B65H 2405/3321* (2013.01); *B65H 2801/39* (2013.01)

(58) Field of Classification Search
CPC ..... B65H 1/04; B65H 31/02; B65H 2405/324; B65H 2405/115; B65H 2405/332; B65H 2405/3321; B65H 2405/3322; H04N 1/00535; H04N 1/0053; H04N 1/00525; H04N 1/00551

See application file for complete search history.

(56) References Cited

U.S. PATENT DOCUMENTS 7,823,877 B2 * 11/2010 Yoshioka ........... H04N 1/00519
271/162
2002/0056957 A1 5/2002 Sekine
2010/0252987 A1 10/2010 Furuyama et al.
(Continued)

FOREIGN PATENT DOCUMENTS

JP 2002-145457 A 5/2002
JP 2010-245624 A 10/2010

*Primary Examiner* — Luis A Gonzalez
(74) *Attorney, Agent, or Firm* — Merchant & Gould P.C.

(57) ABSTRACT

A sheet conveying device includes a conveyor, a first cover and a second cover movable in conjunction with the first cover. The second cover includes a restricted portion configured to be moved together with the second cover. The first cover includes a restricting portion configured to contact the restricted portion to prevent the second cover from being moved from a first position toward a second position when the first cover is located at a closed position. The restricting portion and the restricted portion are contacted to each other at a contact position at which a force, which is applied from the restricted portion toward the restricting portion when the second cover receives an external force, does not include a component force acting in a direction of moving the first cover from the closed position toward an opened position.

19 Claims, 8 Drawing Sheets

(56) References Cited

U.S. PATENT DOCUMENTS

2015/0092255 A1* 4/2015 Sakakibara ........ H04N 1/00559
                                                    358/498
2016/0083204 A1* 3/2016 Murodate .............. B65H 1/266
                                                    271/264

* cited by examiner

SHEET CONVEYING DEVICE AND IMAGE READING APPARATUS

CROSS-REFERENCE TO RELATED APPLICATION

This application claims priority from Japanese Patent Application No. 2014-192970 filed on Sep. 22, 2014, the entire subject-matter of which is incorporated herein by reference.

TECHNICAL FIELD

The present disclosure relates to a sheet conveying device and an image reading apparatus.

BACKGROUND

Regarding an automatic document feeder (hereinafter, referred to as 'ADF') provided for an image reading apparatus, an apparatus of which an apparatus upper surface covering is configured by two moveable members arranged at adjacent positions has been known.

The related-art apparatus has a cover member and a discharge tray, each of which is configured to be rotatable. When the apparatus is not used, the cover member and the discharge tray form an outer covering of the apparatus. At the state where the apparatus is not used, one end of the discharge tray adjacent to the cover member is put on an upper side of one end of the cover member adjacent to the discharge tray. That is, the one end of the cover member and the one end of the discharge tray have parts overlapping with each other in an upper and lower direction. At this state, the cover member restricts the discharge tray from being rotated in a direction along which the one end of the discharge tray is moved downwards.

On the other hand, when using the apparatus, the cover member is rotated in an opening direction. At this time, the cover member is rotated in a direction along which the one end of the cover member is moved downwards. At this time, as described above, the restriction of the discharge tray by the cover member is released, so that it is rotated in the direction along which the one end of the discharge tray is moved downwards.

However, when the above-described structure is adopted, if the discharge tray is pressed from above at the state where the cover member and the discharge tray form the outer covering of the apparatus, the force is applied from the discharge tray, so that the one end of the cover member is moved in a downward direction and the cover member may be thus opened.

For this reason, the cover member is abruptly opened against an intention of a user who does not know that the cover member is opened when the discharge tray is pressed from above.

SUMMARY

Therefore, it is preferably to provide a sheet conveying device and an image reading apparatus capable of suppressing an outer covering configured to be openable and closable from being abruptly opened.

In one aspect of the disclosure, a sheet conveying device comprising: a conveyor configured to convey a sheet along a predetermined conveyance path; a first cover movable between a closed position and an opened position, wherein the first cover is configured to form a part of an outer covering surface of the sheet conveying device by a first surface at the closed position and to support a sheet on a second surface opposite to the first surface at the opened position; and a second cover configured to be movable between a first position and a second position in conjunction with the first cover, wherein the second cover is located at the first position when the first cover is located at the closed position and is configured to form a part of the outer covering surface of the sheet conveying device at a position adjacent to the first cover at the first position, and wherein the second cover is configured to be moved from the first position to the second position when the first cover is moved from the closed position to the opened position, wherein the second cover comprises a restricted portion, wherein the first cover comprises a restricting portion configured to: contact the restricted portion to prevent the second cover from being moved from the first position toward the second position when the first cover is located at the closed position; and move to a position, at which the restricting portion does not interfere with movement of the restricted portion, when the first cover is moved from the closed position to the opened position, and wherein the restricting portion and the restricted portion are configured to be contacted to each other at a contact position at which a force, which is applied from the restricted portion toward the restricting portion when the second cover receives an external force in a direction of moving the second cover from the first position toward the second position at a state where the first cover is located at the closed position, does not comprise a component force acting in a direction of moving the first cover from the closed position toward the opened position.

According to the sheet conveying device configured as described above, when the external force is applied to the second cover in the direction of moving the second cover from the first position to the second position, the force of moving the first cover from the closed position toward the opened position, which is caused due to the external force, is not applied. Therefore, for example, even when the load is applied to the second cover, the first cover is not moved from the closed position toward the opened position by the load, so that it is possible to appropriately keep the first cover at the closed position.

In another aspect of the disclosure, an image reading apparatus comprising a sheet conveying device configured to convey a sheet to be read along a predetermined conveyance path, the sheet conveying device comprising: a conveyor configured to convey the sheet along the predetermined conveyance path; a first cover configured to be movable between a closed position and an opened position, wherein the first cover is configured to form a part of an outer covering surface of the sheet conveying device by a first surface at the closed position and to support a sheet on a second surface opposite to the first surface at the opened position; and a second cover movable between a first position and a second position in conjunction with the first cover, wherein the second cover is located at the first position when the first cover is located at the closed position and is configured to form a part of the outer covering surface of the sheet conveying device at a position adjacent to the first cover at the first position, and wherein the second cover is configured to be moved from the first position to the second position and retreated to a place, at which the second cover does not interfere with movement of the first cover, when the first cover is moved from the closed position to the opened position, wherein the second cover comprises a restricted portion, wherein the first cover comprises a restricting portion configured to: contact the restricted portion to prevent the second cover from being moved from the first position toward the second position when the first cover is located at the closed position; and move to a position, at which the restricting portion does not interfere with movement of the restricted portion, when the first cover is moved from the closed position to the opened position, and wherein the restricting portion and the restricted portion are configured to be contacted to each other at a contact position at which a force, which is applied from the restricted portion toward the restricting portion when the second cover receives an external force in a direction of moving the second cover from the first position toward the second position at a state where the first cover is located at the closed position, does not comprise a component force acting in a direction of moving the first cover from the closed position toward the opened position.

According to the image reading apparatus configured as described above, since the image reading apparatus has the configuration corresponding to the sheet conveying device, it is possible to accomplish the same operations and effects as those of the sheet conveying device.

BRIEF DESCRIPTION OF THE DRAWINGS

The present disclosure is illustrated, and not limited, by way of example by the accompanying figures in which like reference numerals indicate similar elements.

DETAILED DESCRIPTION

Hereinafter, an exemplary illustrative embodiment of the sheet conveying device and the image reading apparatus will be described.

[Configuration of Multi-Function Device]

Figure 1:
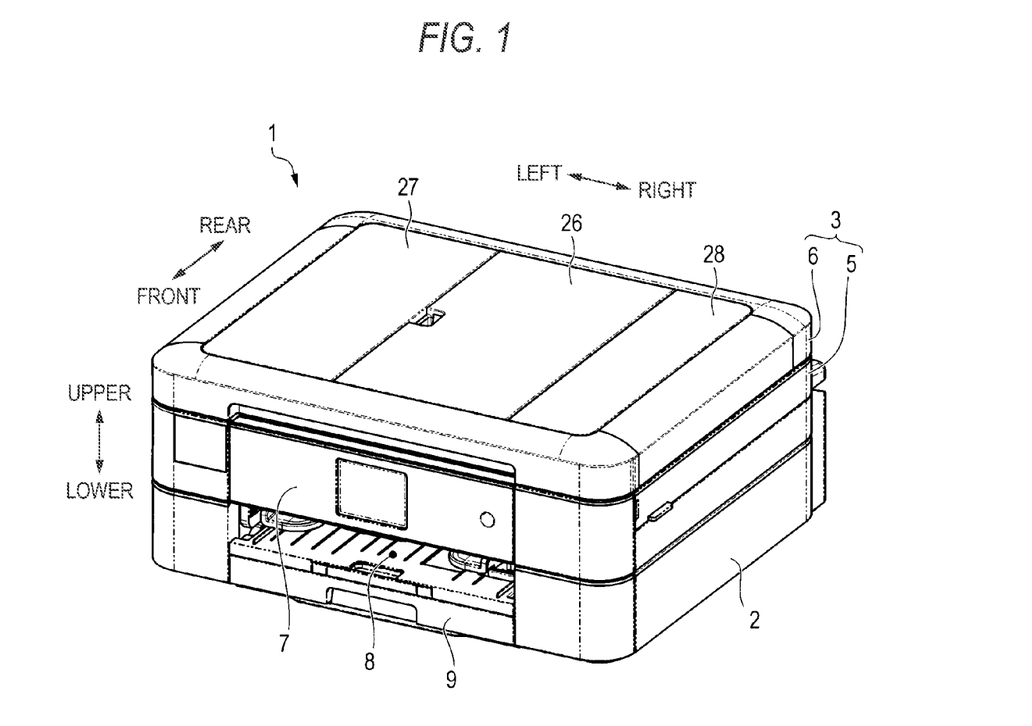
FIG. 1 is a perspective view illustrating an entire outward appearance of a multi-function device.

A multi-function device 1 shown in FIG. 1 is an apparatus having a configuration corresponding to an example of the sheet conveying device. Meanwhile, in below descriptions, in order to simply describe relative positional relations of respective units configuring the multi-function device 1, the upper, lower, left, right, front and rear directions are denoted in the drawings, and the descriptions are made using the respective directions. Among the directions, the upper and lower direction is a direction perpendicular to a horizontal surface when the multi-function device 1 is placed on the horizontal surface, the front is a direction toward which an operation panel 7 faces, the rear is a direction opposite to the front, and the right and left direction is the right and left direction when the multi-function device 1 is seen from the front. However, since the directions of moveable components and the like can be changed, it cannot be said that the directions denoted in the drawings are maintained all the time.

As shown in FIG. 1, the multi-function device 1 has a main body unit 2 and a reading unit 3 (which is an example of the image reading apparatus). In the main body unit 2, a control unit configured to control the entire multi-function device 1, an image forming unit, a LAN communication unit and the like are provided. The reading unit 3 is attached to an upper part of the main body unit 2 and is configured to be movable between a closed position and an opened position.

An upper surface of the main body unit 2 is formed with an opening (not shown). When the reading unit 3 is located at the closed position, the opening of the main body unit 2 is closed by the reading unit 3. When the reading unit 3 is located at the opened position, the opening of the main body unit 2 is opened, so that it is possible to perform maintenance for the components such as the image forming unit and the like accommodated in the main body unit 2 through the opening.

The reading unit 3 has a scanner unit 5 and an ADF unit 6 (which is an example of the sheet conveying device). The structures of the scanner unit 5 and the ADF unit 6 will be described later. A front surface of the multi-function device 1 is provided with the operation panel 7 that is to be operated by a user.

The operation panel 7 has an input device (for example, a touch panel, a variety of buttons and switches) that is to be operated by the user when inputting a variety of commands to the multi-function device 1, and an output device (for example, a liquid crystal monitor device and a variety of lamps) for notifying the user of an operating status and the like of the multi-function device 1.

A discharge port 8 for taking out a recording medium on which an image has been formed in the image forming unit is provided below the operation panel 7. A medium feeding cassette 8 in which recording media to be fed to the image forming unit are accommodated is attached below the discharge port 8.

[Details of Reading Unit]

Figure 2A:
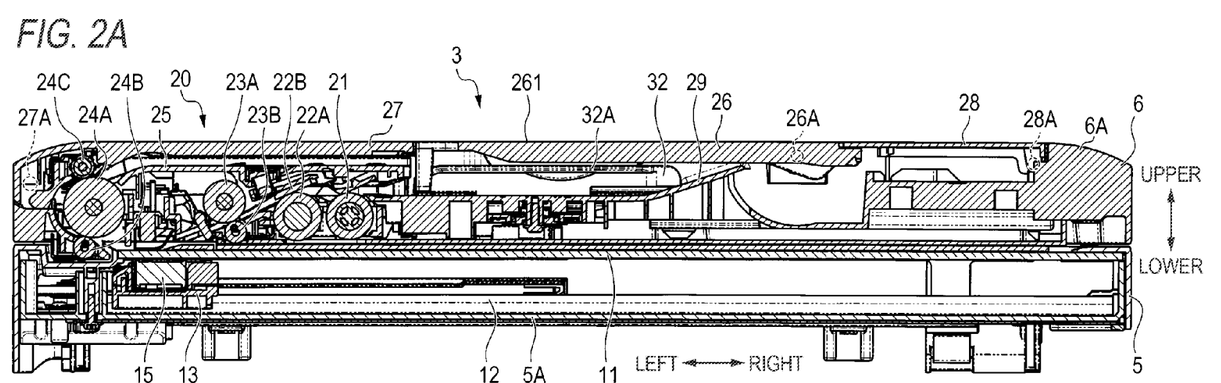
FIG. 2A is a central sectional view illustrating a reading unit at a state where a central cover is located at a closed position.
Figure 2B:
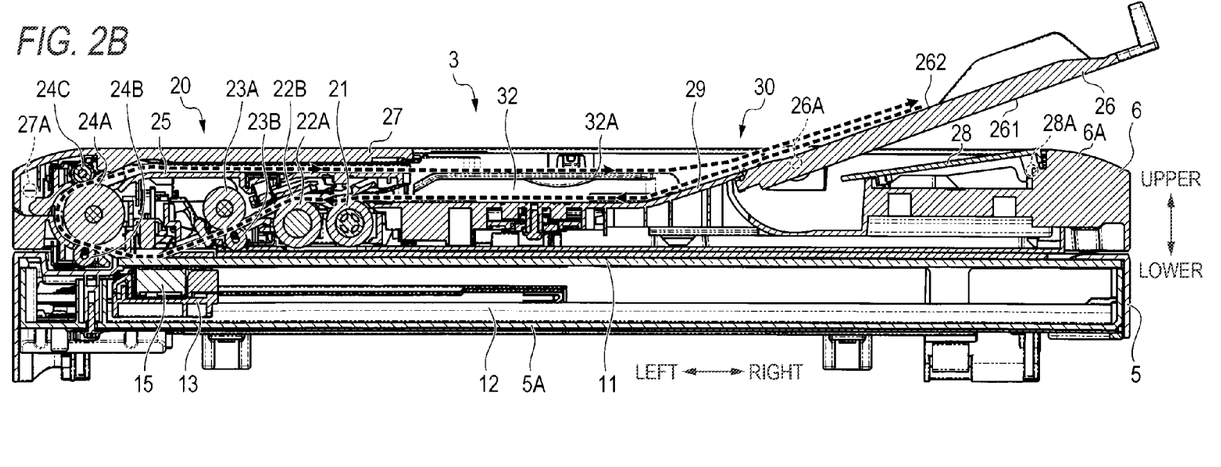
FIG. 2B is a central sectional view illustrating the reading unit at a state where the central cover is located at an opened position.

Subsequently, the structure of the reading unit 3 is described in more detail. In the reading unit 3, the scanner unit 5 is provided with a platen 11, a guide rail 12, a carriage 13, an image sensor 15 and the like, as shown in FIGS. 2A and 2B. The platen 11 is configured by a transparent plate member such as glass plate and acrylic plate and is configured to support a reading target on an upper surface of the scanner unit 5.

The guide rail 12 extends in parallel with a lower surface of the platen 11, and an extension direction thereof is the right and left direction in FIGS. 2A and 2B. Also, in this illustrative embodiment, the guide rail 12 is integrally formed on a bottom inner surface of a scanner base 5A, which is a base part of the scanner unit 5, by a resin material.

The carriage 13 is attached to an upper side of the guide rail 12, so that it is supported to reciprocally move in the right and left direction along the guide rail 12. The carriage 13 is coupled to an endless toothed belt (not shown). The toothed belt is driven to circulate in forward and reverse direction by a motor (not shown). At this time, the carriage 13 is configured to reciprocally move in the right and left direction in conjunction with the circulation of the toothed belt.

The image sensor 15 is one-dimensional image sensor having a plurality of reading elements arranged in one direction. In this illustrative embodiment, a contact image sensor (CIS) is adopted. The image sensor 15 is mounted to the carriage 13 so that the arranging direction of the reading elements is perpendicular to both the right and left direction and the upper and lower direction in FIGS. 2A and 2B, i.e., faces the front and rear direction and the respective reading elements face upwards.

In the reading unit 3, the ADF unit 6 is provided with a conveyor 20 configured to convey a sheet along a predetermined conveyance path (refer to a path shown with a dotted line in FIG. 2B), as shown in FIGS. 2A and 2B. The conveyor 20 has a suction roller 21, a separation roller 22A, a separation piece 22B, a relay roller 23A, a relay pinch roller 23B, a reversal roller 24A, a first reversal pinch roller 24B, a second reversal pinch roller 24C and the like. A guide part 25 extending along the conveyance path is arranged at a position at which the suction roller 21, the separation roller 22A, the separation piece 22B, the relay roller 23A, and the relay pinch roller 23B are covered from above. The components of the conveyor 20 are mounted to an ADF base 6A.

The ADF unit 6 is provided with the ADF base 6A, a central cover 26 (which is an example of the first cover), a left cover 27, and a right cover 28 (which is an example of the second cover). The central cover 26, the left cover 27 and the right cover 28 are rotatably supported to the ADF base 6A by pivotally supporting parts 26A, 27A, 28A, respectively.

One of a support shaft and a bearing configuring the pivotally supporting part 26A may be provided for the central cover 26 and the other may be provided for the ADF base 6A, which is a base part of the ADF unit 6, and the like (for example, the ADF base 6A itself or a member fixed to the ADF base 6A). Likewise, one of a support shaft and a bearing configuring the pivotally supporting part 27A may be provided for the left cover 27 and the other may be provided for the ADF base 6A and the like. One of a support shaft and a bearing configuring the pivotally supporting part 28A may be provided for the right cover 28 and the other may be provided for the ADF base 6A and the like.

At the closed position shown in FIG. 2A, the central cover 26 forms a part of an upper surface covering of the ADF unit 6 by a first surface 261. Also, at the opened position shown in FIG. 2B, the central cover 26 functions as a sub-tray (which is an example of the support member) capable of supporting a sheet by a second surface 262 (hereinafter, the central cover 26 is also referred to as the sub-tray 26). At the state shown in FIG. 2A, a main tray 29 integrally formed with the ADF base 6A is provided below the central cover 26.

When the sub-tray 26 is located at the opened position, the sub-tray 26 and the main tray 29 are arranged to be adjacent to each other. At a place at which the sub-tray 26 and the main tray 29 are adjacent to each other, boundary parts of the sub-tray 26 and the main tray 29 are substantially flush with each other. At this state, both the main tray 29 and the sub-tray 26 configure a sheet feed/discharge unit 30 configured to support a sheet being fed to the conveyor 20 or a sheet being discharged from the conveyor 20.

At the closed position shown in FIG. 2A, the left cover 27 forms a part of the upper surface covering of the ADF unit 6 by an upper surface thereof and covers the conveyor 20 and the guide part 25. At this state, the guide part 25 is arranged with a gap defining a conveyance path between the guide part and the left cover 27 being formed. When the left cover 27 is rotated to the opened position (the opened position is not shown), the conveyor 20 and the guide part 25 are exposed. Therefore, when the sheet is jammed in the conveyor 20, it is possible to remove the sheet by rotating the left cover 27 to the opened position.

The right cover 28 is configured to be movable between a first position shown in FIG. 2A and a second position shown in FIG. 2B, in conjunction with the central cover 26. When the central cover 26 is located at the closed position, the right cover 28 is located at the first position. The right cover 28 located at the first position forms a part of the upper surface covering of the ADF unit 6 at a position adjacent to the central cover 26. Also, when the central cover 26 is moved from the closed position to the opened position, the right cover 28 is moved from the first position to the second position and is thus retreated to a place at which the right cover does not interfere with the movement of the central cover 26.

Figure 3:
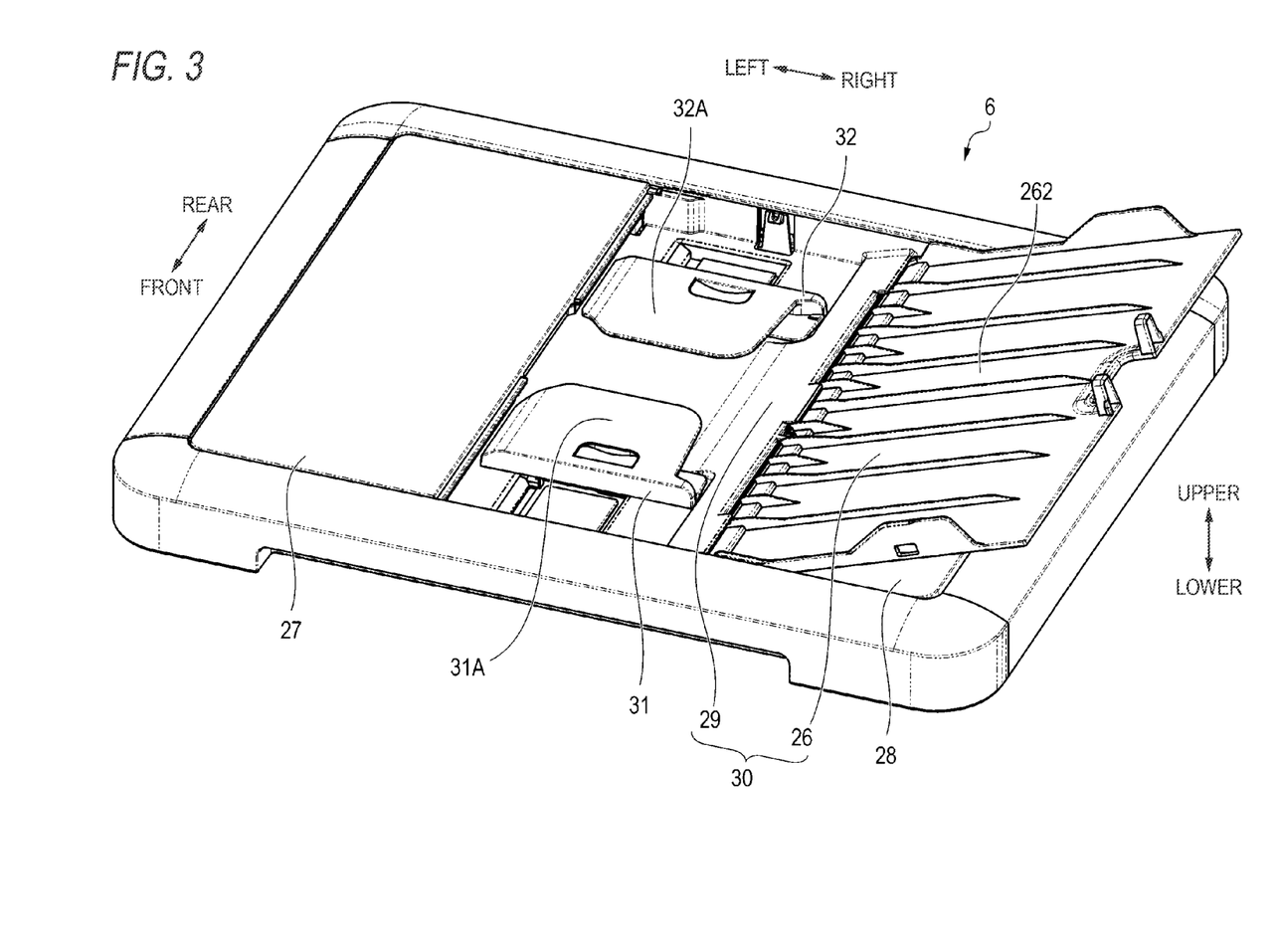
FIG. 3 is a perspective view illustrating an ADF unit at the state where the central cover is located at the opened position.

As shown in FIG. 3, side guides 31, 32 are provided on the main tray 29. The side guides 31, 32 are configured to slide in a width direction of the sheet (the front and rear direction in FIG. 3), thereby changing an interval in the width direction.

When sliding the side guides 31, 32, if a slide guide is slid, the other is slid in an opposite direction to the sliding direction of the slide guide being slid, in conjunction with the sliding. Thereby, it is possible to slide the side guides 31, 32 in a direction toward each other or in a direction away from each other.

The side guides 31, 32 are provided with extension parts 31A, 32A extending substantially horizontally from respective upper ends thereof in a direction of facing each other. When setting the sheet to be fed to the conveyor 20 on the sheet feed/discharge unit 30, the sheet is set below the extension parts 31A, 32A. At this state, the side guides 31, 32 are brought into contact with both end edges of the sheet in the width direction to restrict a setting position of the sheet on the main tray 29 and a sheet conveying direction. Thereby, it is possible to suppress the skew of the sheet being conveyed by the conveyor 20.

The sheet set on the sheet feed/discharge unit 30 is conveyed along the conveyance path shown with the dotted line in FIG. 2B. At this time, the sheet is delivered from an upper surface of the main tray 29 toward a downstream side in the conveying direction by the suction roller 21, and is separated one by one by the separation roller 22A and the separation piece 22B. The separated sheet is delivered toward a downstream side in the conveying direction by the relay roller 23A. The sheet delivered by the relay roller 23A is contacted to an upper surface of the platen 11, passes the contact place and reaches the reversal roller 24A. The sheet having reached the reversal roller 24A is delivered between the guide part 25 and the left cover 27 by the reversal roller 24A and is discharged from the conveyor 20.

The sheet discharged from the conveyor 20 is discharged above the extension parts 31A, 32A, and a part of the sheet reaches above the sheet feed/discharge unit 30 configured by the main tray 29 and the sub-tray 26 (central cover 26), depending on a size of the sheet. That is, in this illustrative embodiment, the sheet feed/discharge unit 30 also functions as a configuration for supporting the conveyed sheet discharged from the conveyor 20.

When reading an image of the sheet being conveyed by the conveyor 20, the image sensor 15 is stopped below the contact place of the sheet and the platen 11 between the relay roller 23A and the reversal roller 24A. Then, when the sheet being conveyed by the conveyor 20 passes through the contact place with contacting the upper surface of the platen 11, the image of the sheet is read through the platen 11.

When reading an image of the reading target supported by the platen 11, the carriage 13 reciprocates in the right and left direction. The image sensor 15 reciprocates in the right and left direction together with the carriage 13. The image sensor reads an image of the reading target through the platen 11 when moving rightward, for example.

[Details of Central Cover, Right Cover, Restricting Portion and Restricted Portion]

Figure 4A:
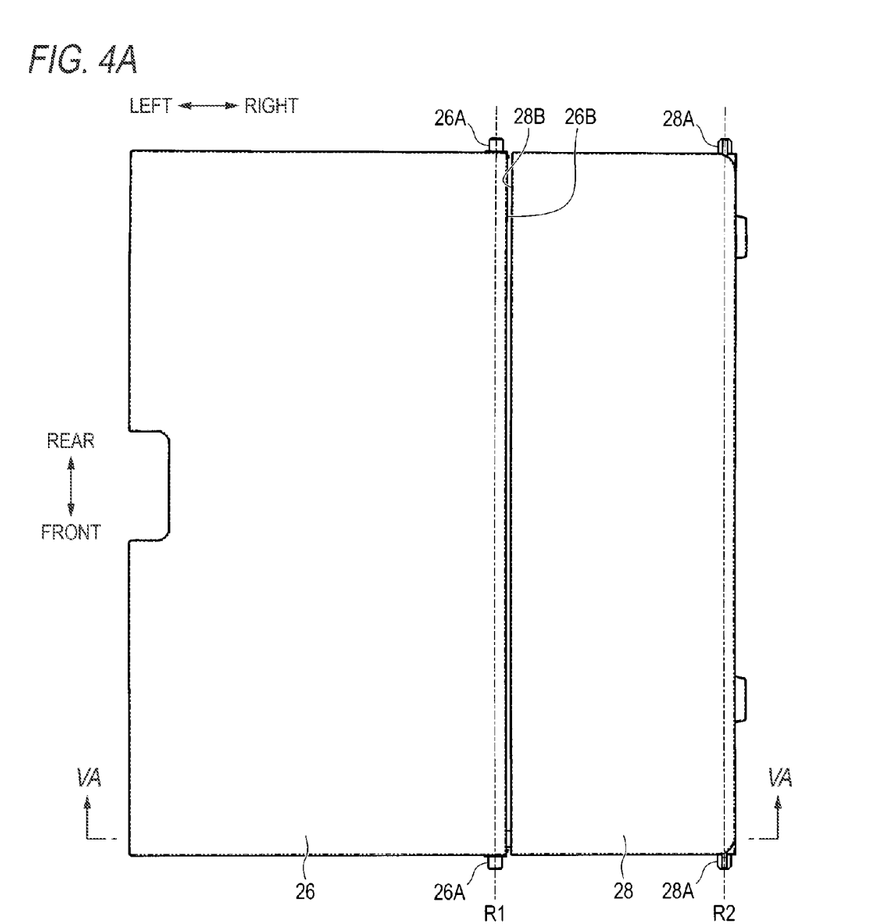
FIG. 4A is a plan view illustrating the central cover located at the closed position and a right cover located at a first position.
Figure 4B:
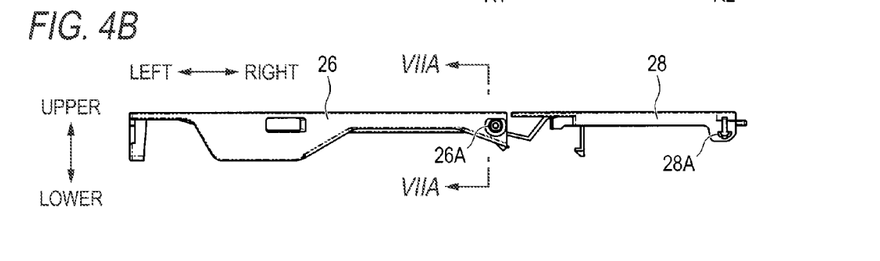
FIG. 4B is a front view illustrating the central cover located at the closed position and the right cover located at the first position.

The central cover 26 and the right cover 28 are plate-shaped members. As shown in FIGS. 4A and 4B, when the central cover 26 is located at the closed position and the right cover 28 is located at the first position, the central cover 26 and the right cover 28 are arranged at adjacent positions at a state where end faces 26B, 28B formed to be parallel with central axes of rotation R1, R2 thereof are made to face each other.

Figure 5A:
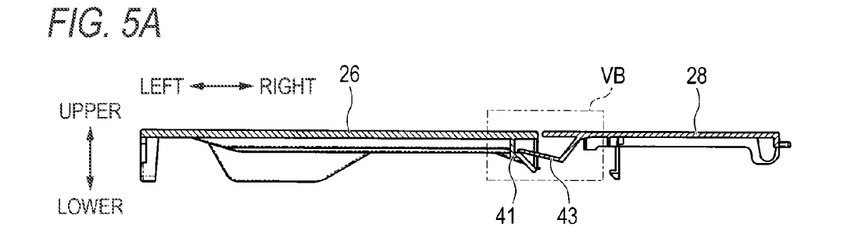
FIG. 5A is a sectional view taken along a line VA-VA of FIG. 4A.
Figure 5B:
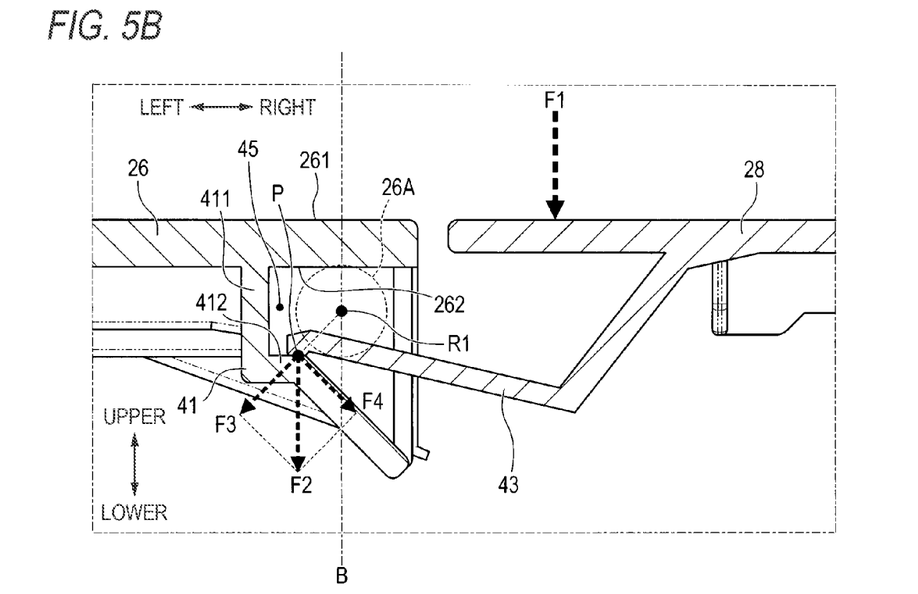
FIG. 5B is an enlarged view of a VB part in FIG. 5A.

A restricting portion 41 is provided at a place adjacent to front and right ends of the central cover 26 at the state where the central cover 26 is located at the closed position, as shown in FIGS. 5A and 5B. Also, a restricted portion 43 is provided at a place adjacent to front and left ends of the right cover 28 at the state where the right cover 28 is located at the first position.

The restricting portion 41 has a first part 411 and a second part 412. The first part 411 extends in a first extension direction from a second surface 262 of the central cover 26, and the first extension direction is a direction extending away from the second surface 262 (a downward direction in FIG. 5B). The second part 412 extends in a second extension direction from a tip of the first part 411 with respect to the first extension direction toward a bending direction with respect to the first extension direction, and the second extension direction is a direction of coming close to the right cover 28 (a rightward direction in FIG. 5B) at the state where the central cover 26 is located at the closed position. Specifically, the second part includes a horizontal part and an inclined part. The horizontal part is positioned between a lower end of the first part 411 and the inclined part. The horizontal part extends in a direction parallel with the second surface 262. The inclined part extends from an end of the horizontal part in a direction of extending away from the second surface 262. A gap 45 is formed between the second surface 262 and the second part 412.

In this illustrative embodiment, the restricted portion 43 has a first inclined part, a second inclined part and a tip portion. The first inclined part extends obliquely in a left and lower direction from a vicinity of an end (left end in FIG. 5B) of a lower surface of the right cover 28 facing the central cover 26. The second inclined part extends obliquely in a left and upper direction from a left end of the first inclined part. The tip portion slightly protrudes obliquely in a left and lower direction from a left end of the second inclined part and is capable of contacting a horizontal part of an upper surface of the second part 412 at a lower surface of a protruding part where tip portion protrudes.

When the central cover 26 is located at the closed position, the restricted portion 43 is inserted into the gap 45, and a tip of the restricted portion 43 and the second part 412 are contacted to each other at the corresponding position. In this illustrative embodiment, the horizontal part of the second part 412 and the tip portion of the restricted portion 43 are contacted. Thereby, the restricting portion 41 and the restricted portion 43 restrict the right cover 28 from being moved from the first position to the second position at the state where the central cover 26 is located at the closed position.

More specifically, a center of gravity of the right cover 28 is located at a position closer to the central cover 26 (left side in FIGS. 4A and 4B), than the pivotally supporting part 28A. For this reason, the right cover 28 is always urged in a direction along which an end portion of the central cover 26-side (left side in FIG. 4B) is moved downwards by its own weight.

However, at the state where the right cover 28 is located at the first position, the restricting portion 41 is contacted to the restricted portion 43 at a contact position P shown in FIG. 5B. For this reason, the restricted portion 43 is restricted from being moved downwards by the restricting portion 41, and the right cover 28 configured to be moved integrally with the restricted portion 43 cannot also be moved from the first position toward the second position. That is, the right cover 28 is kept at the first position as long as the central cover 26 is located at the closed position.

The contact position P of the restricting portion 41 and the restricted portion 43 is located at a position (i.e., a left side of a boundary surface B in FIG. 5B) spaced from the right cover 28 with a boundary surface B (refer to FIG. 5B) (which is a virtual surface assumed at a position orthogonal to the first surface 261, which is an outer covering surface of the central cover 26, and passing to the center of rotation R1 of the central cover 26) being interposed therebetween, when the central cover 26 is located at the closed position.

At the contact position P, when the restricting portion 41 and the restricted portion 43 are contacted to each other, it is possible to suppress the central cover 26 from being moved toward the opened position even though an external force is applied to the right cover 28 in a direction of moving the right cover 28 from the first position to the second position.

For example, when the external force F1 shown in FIG. 5B is applied to the right cover 28, a force F2 is applied from the restricted portion 43 to the restricting portion 41. As described above, when the restricting portion 41 and the restricted portion 43 are contacted to each other at the contact position P, the force F2 applied to the restricting portion 41 does not include a component force acting in a direction of moving the central cover 26 from the closed position to the opened position.

That is, as shown in FIG. 5B, the force F2 applied from the restricted portion 43 to the restricting portion 41 at the contact position P corresponds to a resultant force of a component force F3 acting in a direction (i.e., centrifugal direction) of extending away from the center of rotation R1 of the central cover 26 and a component force F4 acting in a direction orthogonal to the acting direction (the centrifugal direction) of the component force F3.

The component force F3 does not act as a force of rotating the central cover 26. Also, when the contact position P is located at the position as described above, the component force F4 acts in a direction of urging the central cover 26 toward the closed position. Therefore, the component forces F3, F4 are not the component forces acting in a direction of moving the central cover 26 from the closed position toward the opened position and are not included in the force F2.

For this reason, when the external force F1 moving the right cover 28 from the first position toward the second position is applied to the right cover 28, even though the force F2 is correspondingly applied to the central cover 26 at the contact position P, the central cover 26 is not moved toward the opened position.

Figure 6A:
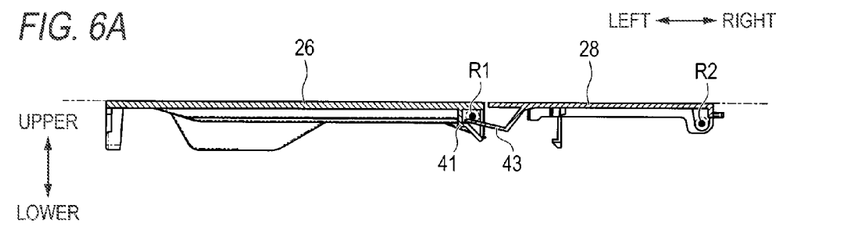
FIG. 6A illustrates the central cover located at the closed position and the right cover located at the first position.
Figure 6B:
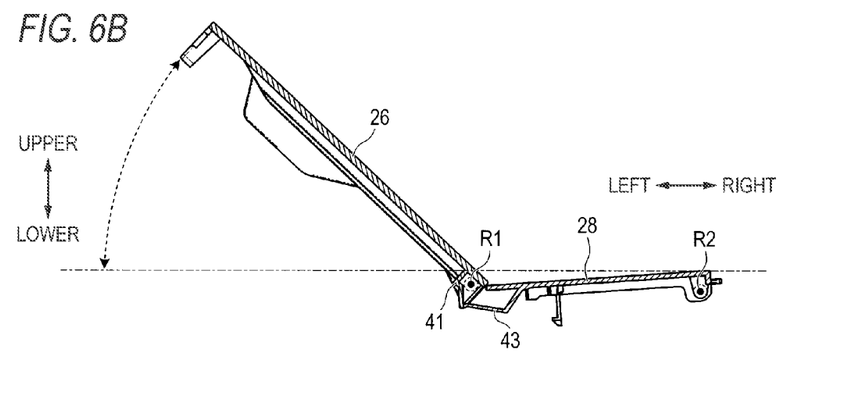
FIG. 6B illustrates the central cover rotated from the closed position toward the opened position by 43° and the right cover rotated in conjunction with the rotation.
Figure 6C:
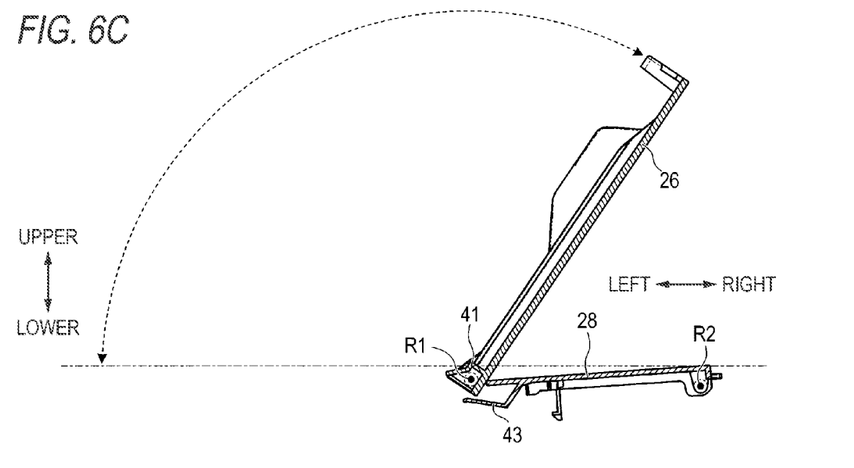
FIG. 6C illustrates the central cover rotated to the closed position and the right cover rotated in conjunction with the rotation.

In the meantime, when the central cover 26 is moved from the closed position toward the opened position by a user's operation, the restricting portion 41 is moved together with the central cover 26, as shown in FIGS. 6A to 6C. That is, when the central cover 26 starts to be moved toward the opened position, the restricting portion 41 is also moved, and the contact state of the restricting portion 41 and the restricted portion 43 at the contact position P is released. At this time, the right cover 28 starts to rotate by its own weight or by a force applied from the central cover 26, and the central cover 26 and the right cover 28 reach a position shown in FIG. 6B. When the central cover 26 is further moved toward the opened position, the restricting portion 41 is spaced from the restricted portion 43 and is moved to a position at which it does not interfere with the movement of the restricted portion 43 (refer to FIG. 6C). Thereby, the right cover 28 is moved to the second position due to the own weight thereof, and when the central cover 26 is moved to the opened position, it is possible to avoid the interference between the central cover 26 and the right cover 28.

When the central cover 26 is moved from the opened position toward the closed position, the restricting portion 41 is contacted to a tip of the restricted portion 43 from below at the position shown in FIG. 6B. Thereafter, while the central cover 26 is further moved toward the closed position, the restricting portion 41 keeps the contact state with the restricted portion 43, the central cover 26 and the right cover 28 are moved, the central cover 26 reaches the closed position, and the right cover 28 reaches the first position (refer to FIG. 6A).

Figures 7A, 7B:
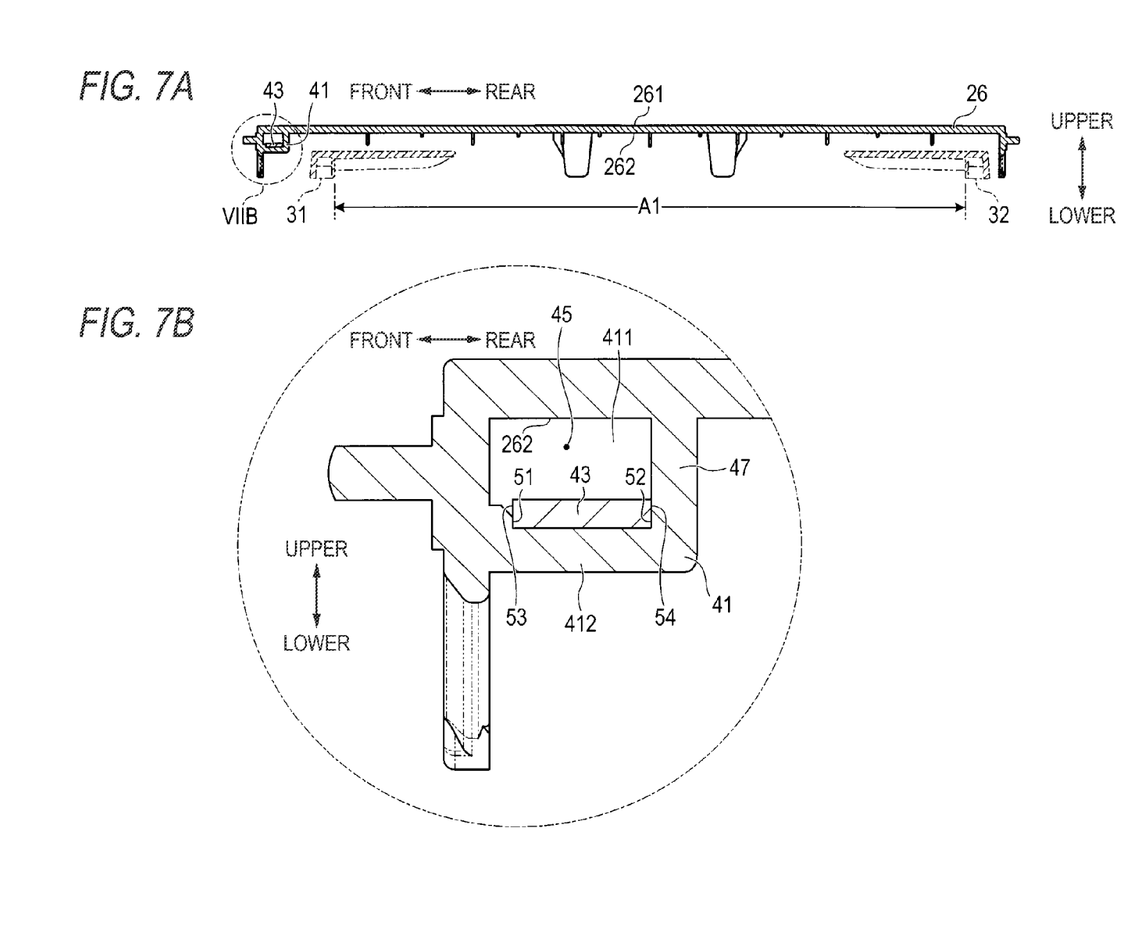
FIG. 7A is a sectional view taken along a line VIIA-VIIA of FIG. 4B.
FIG. 7B is an enlarged view of a VIIB part in FIG. 7A.

Also, the restricting portion 41 has a wall part 47, as shown in FIGS. 7A and 7B. The wall part 47 is formed at a place adjacent to the gap 45 between the second surface 262 of the central cover 26 and the second part 412 of the restricting portion 41. At a state shown in FIG. 7B, the wall part 47 protrudes downwards from the second surface 262 of the central cover 26, is connected to the second part 412 of the restricting portion 41 and covers the gap 45 from the rear.

As shown in FIG. 7B, the restricting portion 41 has a first contact part 51 and a second contact part 52 at positions facing each other with an area, in which the restricted portion 43 is to be inserted, being interposed therebetween. The restricted portion 43 has a third contact part 53 and a fourth contact part 54, which are located at positions at which they are respectively contacted to the first contact part 51 and the second contact part 52 when the restricted portion 43 is inserted between the first contact part 51 and the second contact part 52.

At the state where the central cover 26 is located at the closed position and the right cover 28 is located at the first position, the first contact part 51 and the third contact part 53 are contacted to each other, and the second contact part 52 and the fourth contact part 54 are contacted to each other. At this time, the first contact part 51 and the third contact part 53 have wall surfaces perpendicular to the front and rear direction shown in FIG. 7B, and are contacted to each other at the perpendicular wall surfaces. Also, the second contact part 52 and the fourth contact part 54 have wall surfaces perpendicular to the front and rear direction shown in FIG. 7B, and are contacted to each other at the perpendicular wall surfaces.

Thereby, the first contact part 51, the second contact part 52, the third contact part 53 and the fourth contact part 54 are configured to restrict the central cover 26 and the right cover 28 from being relatively moved in the central axis direction of rotation (the front and rear direction shown in FIGS. 7A and 7B). For this reason, the central cover 26 and the right cover 28 are directly positioned without a separate component except for the central cover 26 and the right cover 28.

Figure 8A:
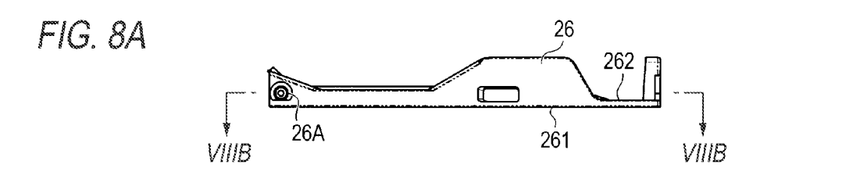
FIG. 8A is a front view illustrating the central cover of which a second surface faces upwards.
Figure 8B:
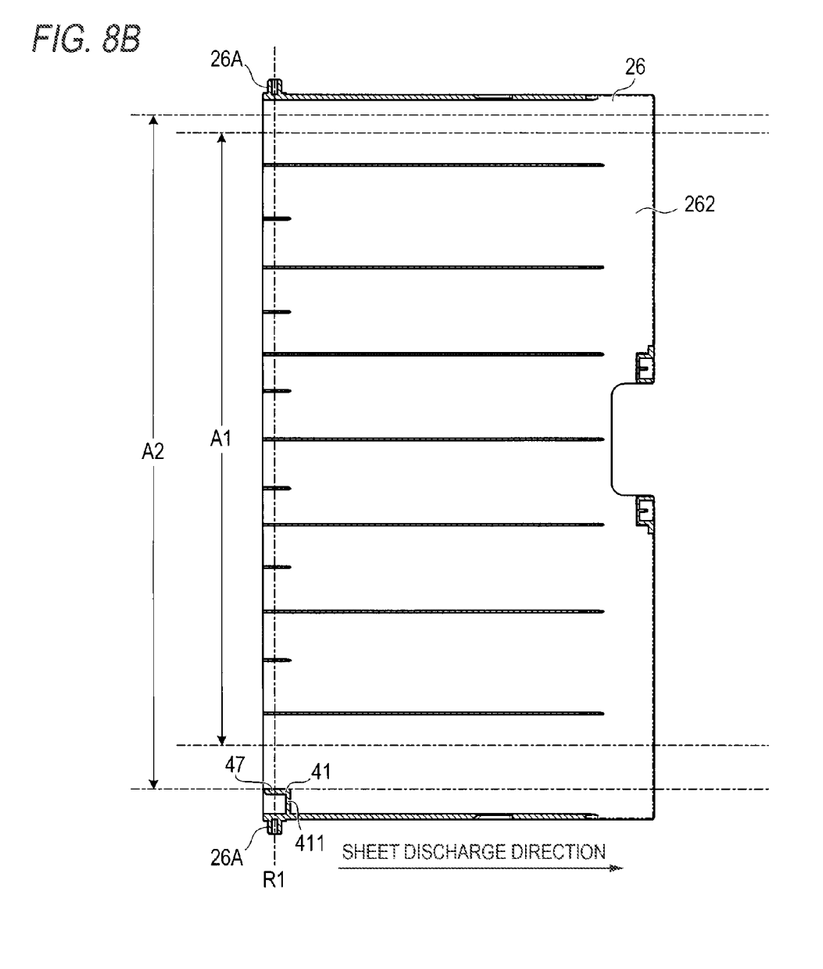
FIG. 8B is a sectional view taken along a line VIIIB-VIIIB in FIG. 8A.

Also, as shown in FIGS. 8A and 8B, the second surface 262 of the central cover 26 is configured so that a part of an entire range in a width direction orthogonal to the sheet conveying direction on the central cover 26 is used as conveyance area A1 of the sheet. As shown in FIG. 7a, a width of the conveyance area A1 (a width in the front and rear direction shown in FIG. 8B) corresponds to a distance between the side guides 31, 32 of which the interval is enlarged to the maximum width in the front and rear direction shown in FIG. 7A. For this reason, when the sheet is discharged from the conveyor 20, the sheet is delivered on the sub-tray 26 toward a downstream side (a sheet discharge direction shown in FIG. 8B) in the conveying direction in the conveyance area A1.

Regarding the conveyance area A1, the restricting portion 41 is provided at a position deviating from the conveyance area A1, as shown in FIGS. 7A and 8B. For this reason, it is possible to suppress the sheet, which is being delivered toward a downstream side in the conveying direction in the conveyance area A1, from interfering with the restricting portion 41.

In the meantime, when a plurality of sheets is discharged from the conveyor 20, the previously discharged sheet may be pushed by the sheet being discharged thereafter. In this case, the previously discharged sheet may be slightly inclined and protrude beyond the conveyance area A1. However, since the restricting portion 41 is provided at the position sufficiently spaced from the conveyance area A1, considering the inclination of the sheet, it is also possible to suppress the inclined sheet from interfering with the restricting portion 41.

For reference, as shown in FIG. 8B, a configuration where the sheet is delivered toward a downstream side in the conveying direction in a conveyance area A2 wider than the conveyance area A1 in the front and rear direction may also be adopted. In this case, since the restricting portion 41 is closer to the conveyance area A2, if the sheet is slightly inclined, a corner of the sheet may contact the restricting portion 41. However, also in this case, as described above, the restricting portion 41 has the wall part 47, and the wall part 47 extends along the sheet conveying direction and prevents an end edge of the sheet from being entered into the gap 45. Therefore, when the wall part 47 is provided, even though the restricting portion 41 is close to the conveyance area A2, the corner of the sheet is difficult to protrude into the gap 45, so that it is possible to suppress the sheet from interfering with the restricting portion 41.

As described above, according to the multi-function device 1, even when the external force is applied to the right cover 28 in the direction of moving the right cover 28 from the first position to the second position, the force of moving the central cover 26 from the closed position toward the opened position, which is caused due to the external force, is not applied. Therefore, for example, even when the load is applied to the right cover 28, the central cover 26 is not moved from the closed position toward the opened position by the load, so that it is possible to appropriately keep the central cover 26 at the closed position.

Also, according to the multi-function device 1, the restricting portion 41 is provided at the position deviating from the conveyance area A1. For this reason, the sheet being fed to the conveyor 20 or the sheet being discharged from the conveyor 20 is conveyed without interfering with the restricting portion 41. Therefore, it is not necessary to design a configuration where the restricting portion 41 is positioned in the conveyance area A1, for example, a shape of the restricting portion 41 with which the sheet does not catch easily, and it is possible to design the restricting portion 41 on the basis of the functions thereof.

Alternatively, even though a configuration where the restricting portion 41 and the conveyance area A2 are close to each other is adopted for the multi-function device 1, the wall part 47 is provided, so that it is possible to suppress the end edge of the sheet being discharged from the conveyor 20 from being entered into the gap 45. Therefore, as compared to a configuration where the wall part 47 is not provided, it is possible to suppress the end edge of the sheet from interfering with the restricting portion 41.

Also, according to the multi-function device 1, when the central cover 26 is located at the closed position, the first contact part 51 and the third contact part 53 are contacted to each other, the second contact part 52 and the fourth contact part 54 are contacted to each other, and the central cover 26 and the right cover 28 are not relatively moved in the width direction orthogonal to the sheet conveying direction. Therefore, as compared to a configuration where each of the central cover 26 and the right cover 28 is positioned with respect to the other member, it is possible to directly position the relative positions of the central cover 26 and the right cover 28 with precision, so that it is possible to improve an appearance when the central cover 26 and the right cover 28 form the outer covering surface.

Other Illustrative Embodiments

Although the exemplary illustrative embodiment of the sheet conveying device and the image reading apparatus has been described, the present disclosure is not limited to the exemplary illustrative embodiment and can be implemented in a variety of forms without departing from the technical spirit of the present disclosure.

For example, in the above illustrative embodiment, the contact position P of the restricting portion 41 and the restricted portion 43 is located across the boundary surface B from the right cover 28. However, the contact position P may be provided at any position, rather than the exemplified position, inasmuch as a functionally equivalent configuration can be implemented. That is, the contact position P may be provided at a position at which the force applied from the restricted portion 43 toward the restricting portion 41 does not include the component force acting in the direction of moving the central cover 26 from the closed position toward the opened position. For example, the contact position P may be a position (i.e., a position overlapping with the boundary surface B) just below the center of rotation R1 of the central cover 26.

Also, in the above illustrative embodiment, the restricting portion 41 is provided at the position deviating from the conveyance area A1. However, when the restricting portion 41 is formed to have an inclination or round shape so that the sheet does not catch easily, the restricting portion 41 may be provided in the conveyance area A1.

Also, in the above illustrative embodiment, the positioning is performed in the central axis directions of rotation R1, R2 of the central cover 26 and the right cover 28 by the restricting portion 41 and the restricted portion 43. However, it is arbitrary to provide the restricting portion 41 and the restricted portion 43 with the positioning function. For example, even when the equivalent positioning is performed, a dedicated positioning mechanism may be provided separately from the restricting portion 41 and the restricted portion 43. Alternatively, when the equivalent positioning is not performed, it is not necessary to provide a dedicated positioning mechanism separately from the restricting portion 41 and the restricted portion 43.

Also, in the above illustrative embodiment, one set of the restricting portion 41 and the restricted portion 43 is provided. However, a plurality of sets of the restricting portion 41 and the restricted portion 43 may be provided. In this case, the central cover 26 may be restricted from being moved forwards relative to the right cover 28 by one set of the restricting portion 41 and the restricted portion 43, the central cover 26 may be restricted from being moved rearwards relative to the right cover 28 by one separate set of the restricting portion 41 and the restricted portion 43, and the positioning may be performed in the central axis directions of rotation R1, R2 of the central cover 26 and the right cover 28 by the entire configuration.

Also, in the above illustrative embodiment, the ADF unit 6 provided for the multi-function device 1 has been exemplified as the sheet conveying device. However, it is arbitrary to adopt the above configuration for the multi-function device, and the above configuration may be adopted for an image reading apparatus having a single function, a copier, a facsimile apparatus and the like.

From the above exemplary illustrative embodiment, it can be understood that the sheet conveying device and the image reading apparatus described in the specification may further have following configurations.

First, in the sheet conveying device, the first cover may be configured to be rotatable between the closed position and the opened position, and the second cover may be configured to be rotatable between the first position and the second position.

Also, in the sheet conveying device or the image reading apparatus, the contact position may be located across a virtual boundary surface from the second cover when the first cover is located at the closed position, the virtual boundary surface being assumed at a position orthogonal to an outer covering surface configured by the first cover and passing a center of rotation of the first cover.

According to the sheet conveying device or the image reading apparatus configured as described above, the contact position of the restricted portion and the restricting portion can be set to a position at which the first cover is not rotated toward the opened position even when the external force is applied to the second cover.

Also, in the sheet conveying device or the image reading apparatus, the restricting portion may have a first part extending from a second surface, an extension direction thereof being a direction of extending away from the second surface, and a second part extending from a tip of the first part with respect to the extension direction in a bending direction with respect to the extension direction, an extension direction thereof being a direction of coming close to the second cover at a state where the first cover is located at the closed position, and a gap being formed between the second part and the second surface. When the first cover is located at the closed position, the restricted portion may be inserted into the gap between the second surface and the second part and the tip of the restricted portion and the second part may be thus contacted to each other at the corresponding position.

Also, in the sheet conveying device or the image reading apparatus, a wall part capable of preventing an end edge of the sheet being discharged from the conveyor from being inserted into the gap may be formed at a place adjacent to the gap between the second surface and the second part.

According to the sheet conveying device or the image reading apparatus configured as described above, it is possible to prevent the end edge of the sheet being discharged from the conveyor from being inserted into the gap by the wall part. Therefore, as compared to a configuration where the wall part is not provided, it is possible to suppress the end edge of the sheet from interfering with the restricting portion.

Also, in the sheet conveying device or the image reading apparatus, at a state where the first cover is located at the closed position and the second cover is located at the first position, the first cover and the second cover may be configured to be arranged at adjacent positions at a state where end faces formed to be parallel with the central axis lines of rotation thereof are made to face each other.

Also, in the sheet conveying device or the image reading apparatus, the first cover may be configured so that a part of an entire range in a width direction orthogonal to the sheet conveying direction on the first cover is used as a conveyance area of the sheet, and the restricting portion may be provided at a position deviating from the conveyance area.

According to the sheet conveying device or the image reading apparatus configured as described above, the restricting portion is provided at the position deviating from the conveyance area. For this reason, the sheet being fed to the conveyor or the sheet being discharged from the conveyor is conveyed without catching with the restricting portion. Therefore, it is not necessary to design a configuration where the restricting portion is positioned in the conveyance area, for example, a shape of the restricting portion with which the sheet does not catch easily, and it is possible to design the restricting portion on the basis of the functions thereof.

Also, in the sheet conveying device or the image reading apparatus, the restricting portion has a first contact part and a second contact part, and the restricted portion has a third contact part and a fourth contact part. When the first cover is located at the closed position, the first contact part and the third contact part may be contacted to each other and the second contact part and the fourth contact part may be contacted to each other, so that the first cover and the second cover are restricted from being relatively moved in the width direction orthogonal to the sheet conveying direction.

According to the sheet conveying device or the image reading apparatus configured as described above, when the first cover is located at the closed position, the first cover and the second cover are directly positioned as regards to the relative positions thereof by the first contact part, the second contact part, the third contact part and the fourth contact part, so that the first cover and the second cover are not relatively moved in the width direction orthogonal to the sheet conveying direction. Therefore, as compared to a configuration where each of the first cover and the second cover is positioned with respect to the other member, it is possible to position the relative positions of the first cover and the second cover with precision, so that it is possible to improve an appearance when the first cover and the second cover form the outer covering surface.

What is claimed is:

1. A sheet conveying device comprising:
a conveyor configured to convey a sheet along a predetermined conveyance path;
a first cover configured to be movable between a closed position and an opened position, wherein the first cover is configured to form a part of an outer covering surface of the sheet conveying device by a first surface at the closed position and to support a sheet on a second surface opposite to the first surface at the opened position; and
a second cover configured to be movable between a first position and a second position in conjunction with the first cover, wherein the second cover is located at the first position when the first cover is located at the closed position and is configured to form a part of the outer covering surface of the sheet conveying device at a position adjacent to the first cover at the first position, and wherein the second cover is configured to be moved from the first position to the second position when the first cover is moved from the closed position to the opened position,
wherein the second cover comprises a restricted portion,
wherein the first cover comprises a restricting portion configured to:
contact the restricted portion to prevent the second cover from being moved from the first position toward the second position when the first cover is located at the closed position; and
move to a position, at which the restricting portion does not interfere with movement of the restricted portion, when the first cover is moved from the closed position to the opened position, and
wherein the restricting portion and the restricted portion are configured to be contacted to each other at a contact position at which a force, which is applied from the restricted portion toward the restricting portion when the second cover receives an external force in a direction of moving the second cover from the first position toward the second position at a state where the first cover is located at the closed position, does not comprise a component force acting in a direction of moving the first cover from the closed position toward the opened position.

2. The sheet conveying device according to claim 1,
wherein the first cover is configured to be rotatable between the closed position and the opened position, and
wherein the second cover is configured to be rotatable between the first position and the second position.

3. The sheet conveying device according to claim 2,
wherein the contact position is located across a virtual boundary surface from the second cover when the first cover is located at the closed position, the virtual boundary surface being orthogonal to the outer covering surface formed by the first cover and passing a center of rotation of the first cover.

4. The sheet conveying device according to claim 2,
wherein the restricting portion comprises:
a first part extending from the second surface of the first cover, an extension direction of the first part being a direction extending away from the second surface; and
a second part extending from a tip of the first part with respect to the extension direction in a bending direction with respect to the extension direction, an extension direction of the second part being a direction toward the second cover at a state where the first cover is located at the closed position, and a gap being formed between the second part and the second surface, and wherein when the first cover is located at the closed position, the restricted portion is inserted into the gap between the second surface and the second part, and a tip of the restricted portion and the second part are contacted to each other.

5. The sheet conveying device according to claim 4, wherein a wall part, which is configured to prevent an end edge of the sheet being discharged from the conveyor from being inserted into the gap, is formed between the second surface and the second part and adjacent to the gap.

6. The sheet conveying device according to claim 2, wherein the first cover and the second cover are configured to be arranged adjacently at a state where an end face of the first cover and an end face of the second cover, which are formed to be parallel with a central axis line of rotation of the first cover and a central axis line of rotation of the second cover, respectively, are made to face each other when the first cover is located at the closed position and the second cover is located at the first position.

7. The sheet conveying device according to claim 2, wherein the first cover is configured such that a part of an entire range in a width direction orthogonal to a sheet conveying direction on the first cover is used as a conveyance area of the sheet, and wherein the restricting portion is provided at a position outside the conveyance area.

8. The sheet conveying device according to claim 1, wherein the restricting portion has a first contact part and a second contact part, wherein the restricted portion has a third contact part and a fourth contact part, and wherein when the first cover is located at the closed position, the first contact part and the third contact part are contacted to each other and the second contact part and the fourth contact part are contacted to each other, so as to restrict the first cover and the second cover from being relatively moved in a width direction orthogonal to a sheet conveying direction.

9. The sheet conveying device according to claim 1, wherein the restricted portion extends from the second cover toward below the second surface of the first cover and a tip of the restricted portion is configured be contacted to the restricting portion at the contact position when the first cover is located at the closed position.

10. The sheet conveying device according to claim 2, wherein the force, which is applied from the restricted portion toward the restricting portion when the second cover receives the external force, comprises a component force acting in a direction away from a center of rotation of the first cover.

11. The sheet conveying device according to claim 1, wherein the force, which is applied from the restricted portion toward the restricting portion when the second cover receives the external force, comprises a component force acting in a direction of urging the first cover toward the closed position.

12. The sheet conveying device according to claim 1, wherein the second cover is configured to be moved from the first position to the second position and to be retreated to a place, at which the second cover does not interfere with movement of the first cover, when the first cover is moved from the closed position to the opened position.

13. An image reading apparatus comprising a sheet conveying device configured to convey a sheet to be read along a predetermined conveyance path, the sheet conveying device comprising:

a conveyor configured to convey the sheet along the predetermined conveyance path;

a first cover configured to be movable between a closed position and an opened position, wherein the first cover is configured to form a part of an outer covering surface of the sheet conveying device by a first surface at the closed position and to support a sheet on a second surface opposite to the first surface at the opened position; and a second cover movable between a first position and a second position in conjunction with the first cover, wherein the second cover is located at the first position when the first cover is located at the closed position and is configured to form a part of the outer covering surface at a position adjacent to the first cover at the first position and wherein the second cover is configured to be moved from the first position to the second position and retreated to a place, at which the second cover does not interfere with movement of the first cover, when the first cover is moved from the closed position to the opened position, wherein the second cover comprises a restricted portion, wherein the first cover comprises a restricting portion configured to:

contact the restricted portion to prevent the second cover from being moved from the first position toward the second position when the first cover is located at the closed position; and move to a position, at which the restricting portion does not interfere with movement of the restricted portion, when the first cover is moved from the closed position to the opened position, and wherein the restricting portion and the restricted portion are configured to be contacted to each other at a contact position at which a force, which is applied from the restricted portion toward the restricting portion when the second cover receives an external force in a direction of moving the second cover from the first position toward the second position at a state where the first cover is located at the closed position, does not comprise a component force acting in a direction of moving the first cover from the closed position toward the opened position.

14. The image reading apparatus according to claim 13, wherein the first cover is configured to be rotatable between the closed position and the opened position, and wherein the second cover is configured to be rotatable between the first position and the second position.

15. The image reading apparatus according to claim 14, wherein the contact position is located across a virtual boundary surface from the second cover when the first cover is located at the closed position, the virtual boundary surface being orthogonal to the outer covering surface formed by the first cover and passing a center of rotation of the first cover.

16. The image reading apparatus according to claim 14, wherein the restricting portion comprises:

a first part extending from the second surface of the first cover, an extension direction of the first part being a direction extending away from the second surface; and a second part extending from a tip of the first part with respect to the extension direction in a bending direction with respect to the extension direction, an extension direction of the second part being a direction toward the second cover at a state where the first cover is located at the closed position, and a gap being formed between the second part and the second surface, and wherein when the first cover is located at the closed position, the restricted portion is inserted into the gap between the second surface and the second part, and a tip of the restricted portion and the second part are contacted to each other.

17. The image reading apparatus according to claim 13, wherein the first cover is configured such that a part of an entire range in a width direction orthogonal to a sheet conveying direction on the first cover is used as a conveyance area of the sheet, and wherein the restricting portion is provided at a position outside the conveyance area.

18. The image reading apparatus according to claim 13, wherein the restricting portion has a first contact part and a second contact part, wherein the restricted portion has a third contact part and a fourth contact part, and wherein when the first cover is located at the closed position, the first contact part and the third contact part are contacted to each other and the second contact part and the fourth contact part are contacted to each other, so as to restrict the first cover and the second cover from being relatively moved in a width direction orthogonal to a sheet conveying direction.

19. A sheet conveying device comprising:

a conveyor configured to convey a sheet along a predetermined conveyance path;

a first cover configured to be movable between a closed position and an opened position, wherein the first cover is configured to form a part of an outer covering surface of the sheet conveying device by a first surface at the closed position and to support a sheet on a second surface opposite to the first surface at the opened position; and a second cover movable between a first position and a second position in conjunction with the first cover, wherein the second cover is located at the first position when the first cover is located at the closed position and is configured to form a part of the outer covering surface at a position adjacent to the first cover at the first position, and wherein the second cover is configured to be moved from the first position to the second position and retreated to a place, at which the second cover does not interfere with movement of the first cover, when the first cover is moved from the closed position to the opened position, wherein the second cover comprises a restricted portion, wherein the first cover comprises a restricting portion configured to:

contact the restricted portion to prevent the second cover from being moved from the first position toward the second position when the first cover is located at the closed position; and move to a position, at which the restricting portion does not interfere with movement of the restricted portion, when the first cover is moved from the closed position to the opened position, wherein the restricting portion and the restricted portion are configured to be contacted to each other at a contact position, the contact position being below a center of rotation of the first cover and being located across the center of rotation of the first cover from an end face of the first cover, when the first cover is located at the closed position, and wherein the restricted portion extends from the second cover toward below the second surface of the first cover and a tip of the restricted portion is contacted to the restricting portion at the contact position when the first cover is located at the closed position.

* * * * *